United States Patent [19]
Crothers et al.

[11] Patent Number: 5,639,954
[45] Date of Patent: Jun. 17, 1997

[54] METHOD AND APPARATUS FOR AUTOMATIC TITRATION OF SOLDER FLUX

[75] Inventors: Robert Arnold Crothers, Noblesville; Robert Francis Krakora, Kokomo; Robert George Starke, Greentown; Michael Lee Paul, Zionsville, all of Ind.

[73] Assignee: Delco Electronics Corporation, Kokomo, Ind.

[21] Appl. No.: 558,123

[22] Filed: Nov. 13, 1995

[51] Int. Cl.$^6$ .................................................. B23K 3/00
[52] U.S. Cl. .................................................. 73/1.01
[58] Field of Search ................ 73/61.59, 863.01, 73/864.81, 1 R; 422/75–77; 228/33, 52; 427/310

[56] References Cited

U.S. PATENT DOCUMENTS

| | | | |
|---|---|---|---|
| 3,447,906 | 6/1969 | Zimmerli | 422/75 |
| 4,165,218 | 8/1979 | Vanhumbeeck et al. | 422/75 |
| 4,640,323 | 2/1987 | Norcia et al. | |
| 4,684,544 | 8/1987 | Arnett | 427/96 |
| 4,749,552 | 6/1988 | Sakisako et al. | 422/75 |
| 4,792,078 | 12/1988 | Takahashi | |
| 5,004,509 | 4/1991 | Bristol | 148/23 |
| 5,179,282 | 1/1993 | Modinger | |
| 5,185,263 | 2/1993 | Kromers et al. | 73/1 R |
| 5,204,264 | 4/1993 | Kraminer | 73/1 R |

*Primary Examiner*—Robert Raevis
*Attorney, Agent, or Firm*—Jimmy L. Funke

[57] ABSTRACT

An automatic titration system that periodically and automatically determines the pH level and acid number of a flux solution in a flux reservoir associated with an automatic flux application apparatus. The automatic titration system pulls the flux solution from the flux reservoir of the fluxing machine on a continuous basis to be filtered. Flux to be sampled by the automatic titration system is deposited in a titration chamber where a titration analysis is performed. A known reagent solution is mixed with the flux solution in the titration chamber to determine the pH level and acid number of the sampled flux during the titration operation. Containers of flux solution and thinner solution located in the automatic titration system allow flux and thinner to be dispensed into the flux reservoir depending on the outcome of the titration analysis, so as to maintain the flux in the flux reservoir at the desirable pH level and acid number.

19 Claims, 2 Drawing Sheets

METHOD AND APPARATUS FOR AUTOMATIC TITRATION OF SOLDER FLUX

BACKGROUND OF THE INVENTION

1. Field of the Invention

This invention relates generally to a method and apparatus for automatically maintaining a desirable value of flux and, more particularly, to a method and apparatus for automatically maintaining flux within a flux reservoir associated with a solder machine at a predetermined pH level and/or acid number by automatically titrating samples of the flux, and adding flux or thinner material to the reservoir based on the results of the titration.

2. Discussion of the Related Art

During a typical process of assembling electrical components on a printed circuit board (PCB), the electrical components are first positioned within suitably configured openings through the printed circuit board, and are then later soldered to conductive traces on the printed circuit board to provide the desirable electrical connections between the components. High capacity manufacturing processes that rapidly produce a great quantity of PCBs of this type generally include machines that insert the electrical components onto the PCB, and machines that solder the components to the board. After the electrical components have been positioned on the PCB, but prior to the PCB being subjected to the soldering step, a flux is applied to the PCB by a flux application apparatus within a soldering machine, such as a wave fluxing or foaming machine or an open spray fluxing drum system or mist system. The soldering flux cleans the conductive traces on the PCB in order to improve intermetallic bonding, and thus, provide better electrical connections.

Modern fluxes are either alcohol based or water based, where the alcohol or water makes up about 95% or more of the flux solution, to accommodate environmental concerns. The alcohol or water base of the flux solution is referred to as thinner in this disclosure. The remaining 5% or less of the flux solution is suitable acids and other chemicals depending on the particular flux. For a discussion of a particular low residue soldering flux of this type, see for example U.S. Pat. No. 5,004,509 issued Apr. 2, 1991 to Bristol, assigned to the assignee of the instant application, and herein incorporated by reference. The concentration of acid and thinner in an acid flux can be determined by titration. Titration of an acid solution is accomplished via addition of a measured quantity of a reagent to raise the pH of the sample to a measured level. The pH is the logarithm of the expression 1/(hydrogen-ion concentration). The acid number of the sample solution can then be calculated. The acid number of an acid flux is a function of its normality.

Because the flux provides a mechanism that enables the solder to better adhere to the conductive traces on a PCB so as to provide high quality electrical connections by the solder, it is necessary that the flux be of a preferred mixture, and not be contaminated by outside particulates that can adversely effect the ability of the flux to perform its function. One problem that effects the quality of the flux occurs as a result of particulate contamination. As the flux is applied to the PCBs, particulates from the PCBs are washed back into the reservoir storing the flux. The particulates mix with the flux, as does air and humidity, and act to form a "white residue" on the PCBs. This residue contaminates the conductive traces on the PCBs, and adversely effects their conduction. The "white residue" can be controlled by maintaining the acid number of the flux below a certain value dependent on the type of acid flux.

Additionally, since modern fluxes are about 95% alcohol or water, heat and humidity within the manufacturing environment cause the flux to evaporate and/or humidity to dissolve into the flux. The evaporation of the thinner causes the mixture of flux in the flux reservoir to diverge from the desirable pH level and acid number that provides the best flux solution. It is therefore necessary that some process be undertaken to monitor the pH level and/or acid number of the flux, and add the appropriate quantity of flux and/or flux thinner as necessary depending on this pH level to correct for evaporation.

Currently, the flux solution of applying flux is monitored by periodically taking flux samples from the flux reservoir during the manufacturing process, and testing the flux. Presently this is done at production lines, in a laboratory environment, to determine the pH level and/or acid number of the flux. Depending on the outcome of those tests, appropriate thinner or flux solution is added to the reservoir to replenish the supply and provide the necessary pH level to the flux already present in the reservoir.

The above-described process of maintaining the appropriate flux solution in the flux reservoir of a fluxing machine has a number of drawbacks. These drawbacks are related to the requirement of operator intervention and the necessity to take a significant number of samples. Specifically, analysis of the flux samples requires extensive training to accurately perform the tests to achieve desirable results.

What is needed is a flux monitoring system that automatically determines the flux pH level and corresponding acid number, and automatically adds the appropriate flux or thinner material to the flux reservoir to maintain a desirable pH level and acid number. It is therefore an object of the present invention to provide such a system.

SUMMARY OF THE INVENTION

In accordance with the teachings of the present invention, an automatic titration system is disclosed that periodically and automatically determines the pH level and acid number of a flux solution in a flux reservoir associated with an automatic fluxing machine. The automatic titration system is a stand alone unit that provides continuous monitoring of the flux used in the soldering operation of a printed circuit board and maintains a desirable pH level and acid number within a specified tolerance. The titration system includes a number of inlet and outlet ports to allow proper connection to the automatic fluxing machine. The automatic titration system, when connected to a flux tank of the solder machine, pulls liquid flux from the flux tank on a continuous basis. Flux to be sampled by the automatic titration system is deposited in a titration chamber where a titration analysis is performed. A known reagent is mixed with the flux in the titration chamber to determine the pH level and acid number of the sampled flux during the titration operation. Containers of flux and thinner located in the automatic titration system allow flux and thinner to be drawn into the flux tank depending on the outcome of the titration analysis, so as to maintain the flux in the flux tank at the desirable pH level and acid number.

Additional objects, advantages and features of the present invention will become apparent from the following description and appended claims, taken in conjunction with the accompanying drawings.

DETAILED DESCRIPTION OF THE PREFERRED EMBODIMENTS

The following description of the preferred embodiments directed to an automatic titration system for maintaining the acid number of a flux in a flux reservoir of a flux application apparatus within a soldering machine, at a desirable pH level and acid number is merely exemplary in nature and is in no way intended to limit the invention or its applications or uses.

Figure 1:
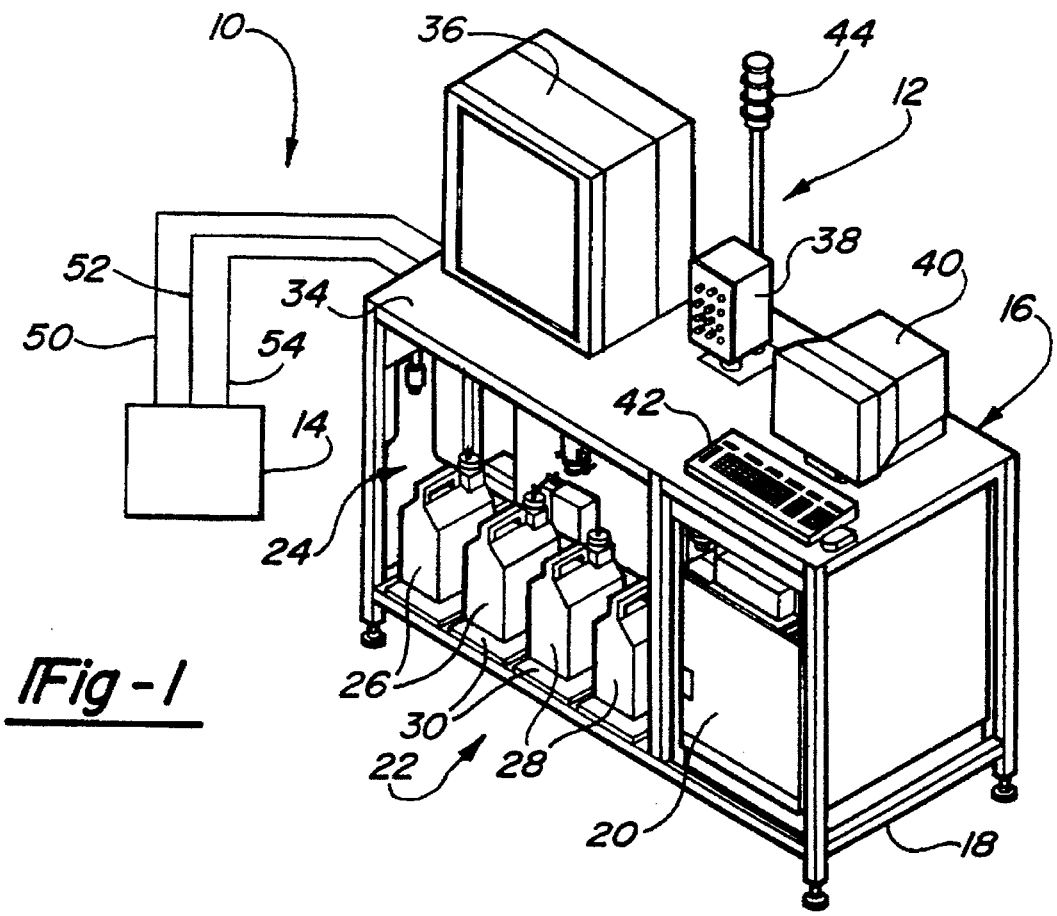
FIG. 1 is a perspective view of an automatic titration system associated with a wave flux machine according to an embodiment of the present invention.
Figure 2:
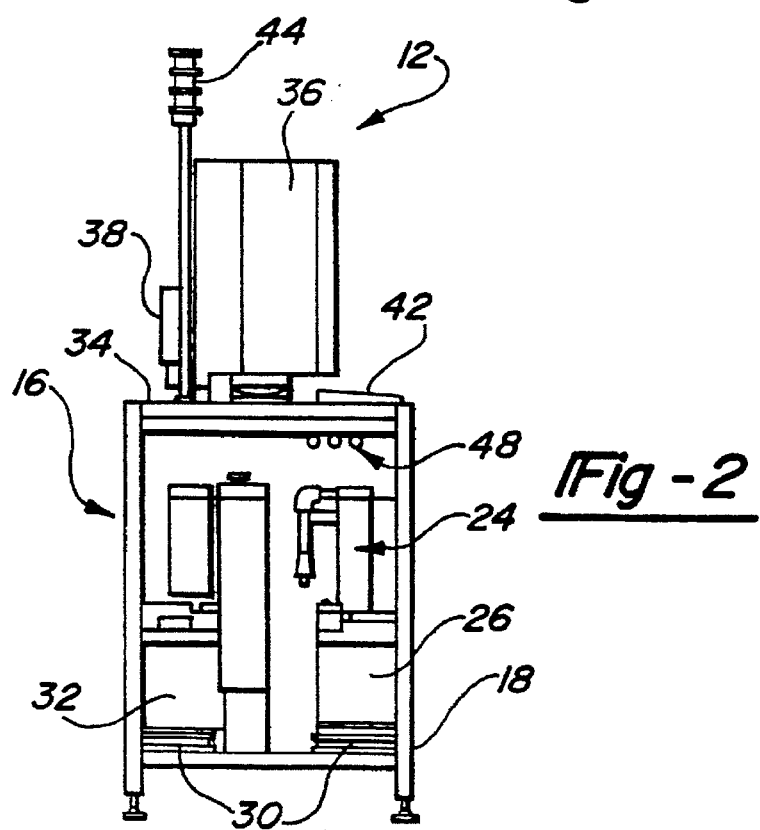
FIG. 2 is an end view of the automatic titration system of FIG. 1.

A perspective view of a flux system 10 including an automatic titration system 12, according to an embodiment of the present invention, and a flux application machine 14 is shown in FIG. 1. FIG. 2 shows an end view of the automatic titration system 12 separated from the flux application machine 14. The machine 14 is intended to represent any appropriate wave flux application apparatus, open spray flux application apparatus or other application apparatus of solder known in the art, that applies a solder flux at a desirable rate to a plurality of PCBs (not shown) in a high capacity production system. Flux that is applied to the PCBs is drawn from a flux reservoir (not shown in FIG. 1) within the machine 14 during the flux operation. The operation of the flux application machine 14 is well understood in the art, and need not be discussed here in any significant detail.

The automatic titration system 12 periodically samples and titrates flux from the flux reservoir in the machine 14 to determine if the flux has a desirable pH level and acid number for the best flux performance. As is understood in the art, titration is a process that can determine the concentration of a substance in solution by adding a standard reagent of known concentration to the solution in carefully measured amounts until a reaction of a definite and a known proportion is achieved. This reaction can be shown in several ways, such as by color change of the solution, by electrical measurement of the solution, or other known testing procedure. Therefore, titration can be used to determine the appropriate concentration of alcohol, if the flux is alcohol based, or water, if the flux is water based, of the flux solution in the flux reservoir within the machine 14. Current commercially available titration systems that semiautomatically perform the above described task includes the DL21 and the DL25 titrators available from Metier-Toledo, Inc., Hightstown, N.J.

The automatic titration system 12 utilizes a closed-loop system. The automatic titration system 12 pulls flux from the flux reservoir in the machine 14 on a continuous basis. The system 12 then periodically samples and titrates the pulled sample to automatically determine the concentration of flux based on a known reagent. After each titration, the system 12 will send a signal to flux and thinner containers within the system 12 to apply the appropriate flux or thinner to the flux reservoir in the machine 14 to arrive at the desirable flux solution.

According to one embodiment of the present invention, the automatic titration system 12 is a stand alone unit that includes a series of components that are assembled and secured on a table 16. The table 16 includes a frame structure 18 that defines a cabinet portion 20 and a lower open portion 22. Electrical systems (not shown), necessary for the operation of the system 12, are positioned within the cabinet 20. The necessary plumbing that allows flux to be drawn from the flux reservoir in the machine 14, and to be transferred from the titration system 12 to the machine 14 is depicted generally at 24 within the open portion 22 of the frame 18. Two flux containers 26 and two thinner containers 28 are positioned in the lower open portion 22 on a series of electrical scales 30. The flux containers 26 store flux in the automatic titration system 12 to be transferred to the flux reservoir in the machine 14. The thinner containers 28 hold flux thinner, either alcohol or water depending on the basis of the flux, to be transferred to the flux reservoir in the machine 14 if the system 12 determines that the flux in the reservoir of the machine 14 has an acid number that is too low, as will be described in greater detail below. The containers 26 and 28 are positioned on the scales 30 so that the scales 30 will provide an electrical indication of when the containers 26 and 28 are empty so that they can be replaced by an operator. Waste containers 32 are also positioned on scales 30 within the open portion 22 to receive waste flux that has been titrated, as will be discussed below. The waste containers 32 are of approximately the same size as the flux containers 26 and the thinner containers 28.

The table 16 includes a table top 34 on which is positioned a titration device 36, a control panel 38, a computer terminal 40 and a computer keyboard 42. The computer terminal 40 allows the titration system 12 to be microprocessor controlled. A light indicator 44 extends from the table top 34 behind the control panel 38. A titration reservoir and reagent reservoir (not shown in FIG. 1) are positioned within the titration device 36 for performing titration of flux sampled from the flux reservoir in the machine 14 to determine the constituents of the flux, as will be discussed in detail below. The control panel 38 allows operator input into the system 12 to control its operation, for example, to initiate start-up and shut-down. The computer terminal 40 and associated keyboard 42 allow user interface to the system 12 to provide the appropriate level of flux titration for a particular application. For example, the system 12 can be programmed to provide periodic and automatic titration at certain time intervals. In one embodiment, the system 12 will perform a titration every 10–20 minutes. The light indicator 44 includes a series of three colored lights to provide different types of warnings and system operations to an operator. For example, if the scales 30 indicate that one of the containers 26 and 28 is empty, an appropriate warning light will be lit on the light indicator 44 to allow the operator to change the container that is empty. Also, if the waste containers 32 are full, the light indicator 44 will alert the operator to such a condition. In one example, a green light will indicate that the system 12 is operating properly, an orange light will provide a warning that the operator needs to perform some function, and a red light will indicate that the system 12 is in a stop mode and is not functioning properly.

A series of three plumbing lines extend from the system 12 to the flux reservoir of the machine 14. As shown in FIG. 2, three quick disconnects 48 allow the plumbing lines to be disconnected from the titration system 12 so that the titration system 12 can be moved to different locations. A first line 50 allows the system 12 to remove flux from the flux reservoir in the machine 14 to be sent to the titration device 36 in the system 12. A second line 52 allows the system 12 to pump flux from the containers 26 to the flux reservoir within the machine 14 at initial start-up, and for filling the flux reservoir during operation in the event that the system determines that the acid number of the flux in the reservoir is below a certain set point. The second line 52 also allows the system 12 to add thinner to the flux reservoir from the thinner containers 28. A third line 54 is used to cycle flux from the flux reservoir within the machine 14 through the system 12 and bypass the titration device 36 in the titration system 12. The third line 54 helps prevent residue from building up, and filters flux being used in the flux reservoir, as will be discussed in more detail below. The design and layout of the automatic titration system 12 shown in FIG. 1 is by way of a non-limiting example in that other configurations of the system components will also work within the scope of the present invention.

Figure 3:
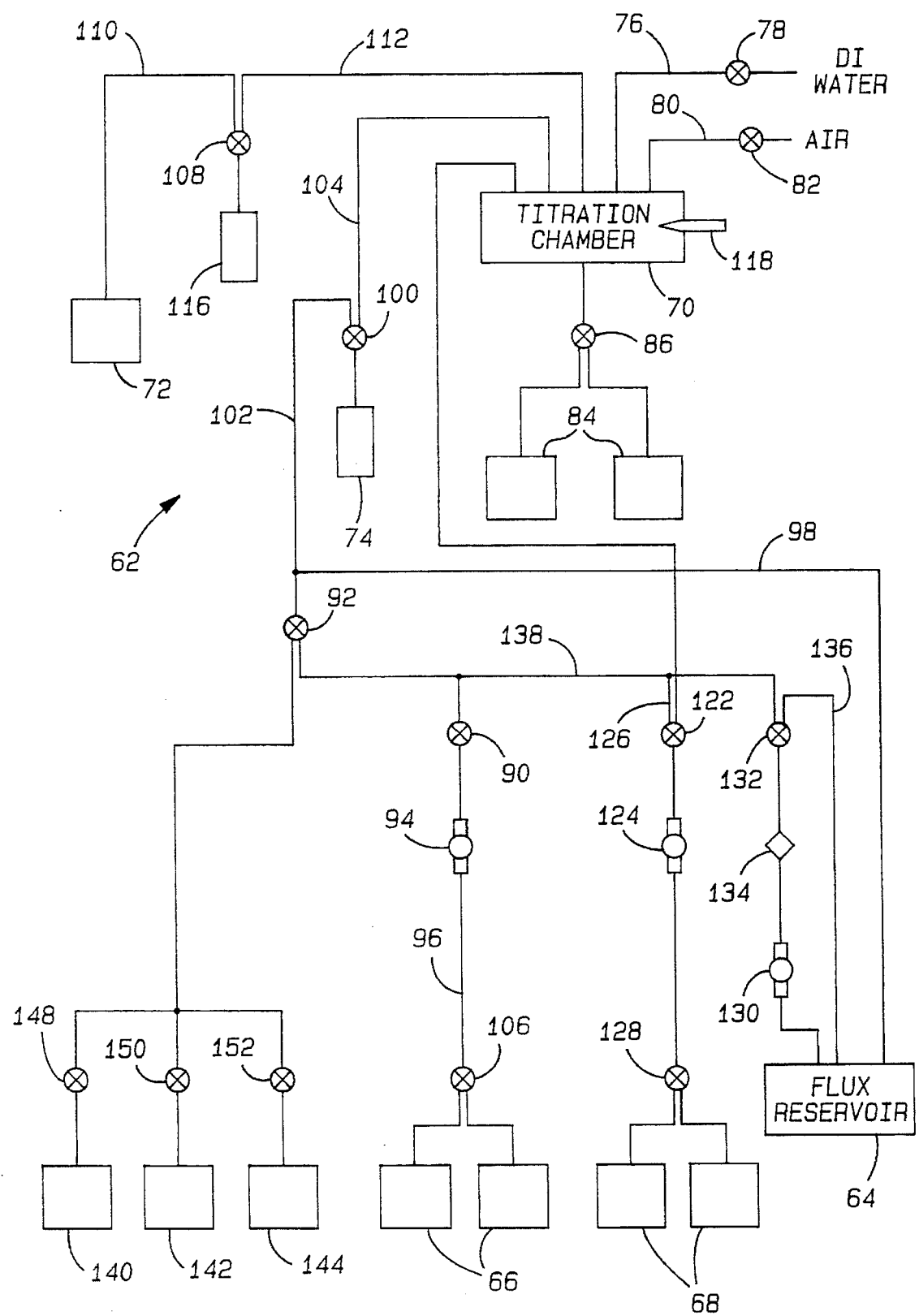
FIG. 3 is a flowchart block diagram depicting the operation of the titration system of the invention.

Turning to FIG. 3, a flowchart diagram 62 depicting the operation of the titration system 12 is shown. The diagram 62 includes a flux reservoir 64 intended to represent the flux reservoir in the flux machine 14, flux containers 66 representing the flux containers 26, thinner containers 68 representing the thinner containers 28, a titration chamber 70 where the titration of the flux from the flux reservoir 64 is performed, and a reagent container 72 that stores a reagent solution to be mixed into the titration chamber 70 as a known reagent so that the system 12 can determine the concentration of flux and thinner within the flux from the flux reservoir 64. Flux from the flux reservoir 64 is stored in a sample syringe 74 as a controlled amount of flux before being mixed in the titration chamber 70 for titration. Deionized water from a water line 76 is applied through a solenoid operated valve 78 into the titration chamber 70 to rinse out the titration chamber 70 after each titration and calibration. Compressed air from an air line 80 is applied through a solenoid operated valve 82 to force liquid out of the titration chamber into waste containers 84, representing waste containers 32, through a solenoid operated valve 86. When the scales 30 indicate that one of the waste containers 84 is full, the valve 86 switches to the other waste container 84 to receive the waste titration liquid.

Initially, the flux reservoir 64, the titration chamber 70, the waste containers 84 and the sample syringe 74 are empty, and the flux containers 66, the thinner containers 68 and the reagent container 72 are full. At start up, solenoid operated flux valves 90 and 92, and a flux pump 94 are energized to draw flux from the flux containers 66 through lines 96 and 98 into the flux reservoir 64. At the same time, a valve 100 is energized to allow a sample of the flux solution from the flux containers 66 to be drawn into the sample syringe 74 through line 102. The flux in the sample syringe 74 allows a controlled amount of flux to be sent to the titration chamber 70 through line 104. A solenoid operated valve 106 is continually switched to one or the other of the flux containers 66 depending on which one can dispense flux to the system 12. In other words, the valve 106 is first switched to a first one of the flux containers 66 until the scales 30 indicate that that flux container 66 is empty, then the valve 106 will switch to allow flux to be drawn from the other flux container 66. When both flux containers 66 are empty, the indicator 44 will light up. When the flux in the flux reservoir 64 has reached a first start-up level, the flux pump 94 and the solenoid valve 90 are de-energized to stop the flow of the flux solution from the containers 66.

The sample of flux solution in the titration chamber 70 from the syringe 74 is then titrated. A valve 108 is energized, and the reagent solution in the reagent container 72 is siphoned through lines 110 and 112 by a reagent syringe 116 into the chamber 70 during the titration to be mixed with the flux. The reagent solution from the reagent container 72 is mixed with the flux solution in the titration chamber 70 on a controlled basis. The amount of reagent solution from the reagent container 72 applied to the titration chamber 70 is determined by taking a pH reading by a pH probe 118 of the solution within the titration chamber 70. In one example, the reagent solution is sodium hydroxide (NaOH), however, other reagent solutions may be applicable in other processes within the scope of the invention. As each new measured amount of reagent solution is applied to the titration chamber 70 to be mixed with the flux solution, the system 12 performs the titration analysis within the chamber 70 to determine the pH level and associated acid number of the flux solution. Once a desirable pH level of the flux solution is achieved from the mixture of the appropriate amount of reagent solution, the system 12 will know how much thinner or flux needs to be added to the original solution of flux applied to the chamber 70 in order to arrive at the desirable flux solution.

The reagent solution for the titration operation is used to determine the quantity of flux or thinner required to reach a particular pH level. The acid number of the solution is then calculated. To arrive at the desirable flux solution, the system 12 balances the equation, $$V_R \times N_R = V_s \times N_s$$

where, $V_R$=the volume of the reagent solution in millimeters;

$N_R$=the normality of the reagent solution;

$V_s$=the volume of the flux sample in millimeters; and $N_s$=the normality of the flux sample.

In one embodiment, the reagent solution is added to the sample flux until the pH level is about 8. By knowing the volume $V_s$ of the flux sample, the normality $N_R$ of the reagent solution and the measured value of the reagent volume $V_R$, the flux solution can be neutralized to the desired pH level by using the equation, $N_s = V_R \times N_R / V_s$. The acid number of an acid flux can then be calculated as acid number=$N_s \times 56.1 / D_s$, where $D_s$=the density of the flux sample.

Since the titration system 12 is microprocessor controlled, it is a straightforward process to one skilled in the art to program the computer terminal 40 to calculate the above equation to determine the pH and acid number of the solution in the titration chamber 70. The program used in association with the automatic titration system 12 can vary between system to system, depending on the differing and various applications. For example, the program may make use of an open-loop system, incorporating look-up tables to calculate the formula above. Also, the program could use a closed-loop system that incorporates an average, ideal level as a target level to which the program attempts to conform.

Titration of the flux sample in the chamber 70 allows the system 12 to determine whether thinner is needed to achieve the desirable flux solution. If thinner is needed, solenoid operated thinner valve 122, and thinner pump 124 are energized to draw thinner into the titration chamber 70 from the containers 68 through lines 126 and 98. A solenoid operated valve 128 operates in the same manner as the valve 106 so as to select which of the two thinner containers 68 should dispense thinner into the system 12. Once the titration process determines that the solution of flux is at the desirable pH level, the flux reservoir 64 is filled the rest of the way by dispensing the appropriate amount of flux from the flux containers 66 and thinner from the thinner containers 68. When the flux reservoir 64 is full, the valves 90 and 122, and the pumps 96 and 124 are de-energized and the flux reservoir 64 is ready for operation.

When the machine 14 is operational, and flux is being removed from the flux reservoir 64 for the fluxing operation, a system pump 130 and a solenoid operated valve 132 are energized to pump flux from the flux reservoir 64 through a filter 134 for filtering purposes. In this manner, flux from the flux reservoir 64 is continuously drawn through line 136 and returned to the reservoir 64 to be filtered. Periodically, the system 12 will initiate a titration process to determine the constituents of the flux in the flux reservoir 64. The automatic titration of the flux in the flux reservoir 64 is performed in the titration chamber 70 by energizing the solenoid operated valve 132 to draw a controlled amount of flux from the flux reservoir 64 through line 138 to the sample syringe 74 by the system pump 130. The valve 94 is then selected to cause the controlled amount of sample flux in the sample container 74 to enter the titration chamber 70 through line 94. The samples in the titration chamber 70 are titrated to determine its pH level by adding the reagent solution from the reagent container 72, and the acid number is calculated in the same manner as discussed above. The results of the titration will determine whether flux or thinner from the containers 66 and 68 should be dispensed to the flux reservoir 64, as also discussed above. After the titration analysis in the titration chamber 70, the titrated sample flux in the titration chamber 70 is sent to the waste containers 84 as discussed above. This titration analysis on the flux solution in the flux reservoir 64 is automatically performed on a periodic basis depending on how the system 12 is programmed.

In order to calibrate the probe 118 to make sure that it is getting an appropriate pH reading of the solution in the titration chamber 70, calibration samples having known pH levels are stored in containers 140, 142 and 144. During a calibration step, the system 12 will select a desirable solution from one of the containers 140, 142 and 144 by energizing the appropriate valve 148, 150 and 152, respectively, and valves 92 and 100 to draw the calibration solution into the sample syringe 74. The calibration sample in the sample syringe 74 is then applied to the titration chamber 70 through line 104 to be measured by the probe 118. If the probe 118 gives a reading that is different than what should be read for the particular calibration sample, the system 12 recalibrates the probe 118 to the desirable pH reading.

The computer terminal 40 will plot all titrations taken and will produce a titration chart automatically. Therefore, the system 12 does not require interface with a full time operator and does not require technically advanced operations. The automatic titration system 12 will virtually connect externally to almost any type of automatic wave solder machine.

The operation of the titration system 12 was specifically discussed with reference to titrating a solder flux to determine its pH level and acid number. However, the titration system of the invention can be readily adapted to other technologies where automatic, and periodic sampling of the pH of some solution is necessary. For example, in the food industry, certain processing of acidic food stuff requires that the acid level of the food stuff be maintained at a particular level. By using the titration system 12, as discussed above, the acidic level of the food stuff can be periodically measured, and appropriate material can be added to the food stuff to correct the acid level if it deviates from the predetermined level.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined from the following claims.

The embodiments of the invention in which an exclusive property of privilege is claimed are defined as follows:

1. An apparatus for automatically monitoring a solder flux, said apparatus comprising:
   a frame structure;
   at least one first container holding a reserve flux solution, said at least one first container positioned in the frame structure;
   at least one second container holding a thinner solution, said at least one second container positioned in the frame structure;
   a reagent container holding a reagent solution, said reagent container positioned in the frame structure;
   a titration system positioned in the frame structure, said titration system including a sample syringe that holds a controlled amount of an operational flux solution taken from a flux reservoir and a reagent syringe that holds a controlled amount of the reagent solution taken from the reagent container, said titration system including a titration container that receives a mixture of a sample of the controlled amount of the operational flux solution from the sample syringe and the controlled amount of the reagent solution from the reagent syringe, said titration system including a pH probe for determining a pH level of the mixture in the titration container, said titration system including means for causing reserve flux solution from the first container or thinner solution from the second container to be dispensed to the flux reservoir depending on the outcome of the titration test;
   a plurality of calibration sample containers positioned in the frame structure, said calibration sample containers holding a plurality of different calibration samples where each calibration sample has a known pH level, said pH probe determining the pH level of the calibration samples in order to calibrate the pH probe; and
   plumbing means for applying the operational flux solution from the reservoir to the sample syringe and applying the controlled amount of the operational flux solution from the sample syringe to the titration container, and for applying the reagent solution from the reagent container to the reagent syringe and applying the controlled amount of the reagent solution from the reagent syringe to the titration container, and for applying the calibration samples to the sample syringe and a controlled amount of the calibration samples to the titration container from the sample syringe, said plumbing means being positioned within the frame structure.

2. The apparatus according to claim 1 wherein the second container holds a thinner solution selected from the group consisting of an alcohol and a water, said reserve flux solution being alcohol or water based.

3. The apparatus according to claim 1 wherein the reagent solution is NaOh.

4. The apparatus according to claim 1 wherein the flux application apparatus is selected from the group consisting of wave fluxing application apparatus, open spray fluxing application apparatus and drum or mist spraying systems.

5. The apparatus according to claim 1 wherein the titration system includes a filter for continuously filtering the flux solution from the flux reservoir, said titration system further including means for continuously drawing the flux solution from the flux reservoir through the filter.

6. The apparatus according to claim 1 wherein the apparatus is computer controlled.

7. The apparatus according to claim 1 further comprising electrical scales that are positioned to measure the weight of the first and second containers, said apparatus further comprising means for providing a warning signal if the first or second container is empty based on an electrical signal from the electrical scales.

8. The apparatus according to claim 1 wherein the titration system performs the titration test at periodic intervals where the periodical intervals are between 10 and 20 minutes.

9. The apparatus according to claim 1 wherein the apparatus includes quick disconnect hoses to be disconnected from the flux application apparatus.

10. The apparatus according to claim 1 wherein the at least one first container is two containers holding a reserve flux solution and the at least one second container is two containers holding a thinner solution.

11. The apparatus according to claim 1 wherein the titration system determines an acid number of the mixture in the titration container by first determining a normality of the sample of the operational flux solution by an equation $$N_S = \frac{V_R \times N_R}{V_S},$$

where $V_R$ is a volume of the reagent solution in millimeters, $N_R$ is a normality of the reagent solution, $V_s$ is a volume of the sample of the flux solution in millimeters, and $N_s$ is the normality of the sample of the flux.

12. An apparatus for automatically monitoring a solder flux, said apparatus comprising:

a frame structure;

a first container holding a thinner solution, said first container being positioned in the frame structure;

a second container holding a reserve flux solution, said second container being positioned in the frame structure;

a reagent container holding a reagent solution, said reagent container being positioned in the frame structure;

a titration system being positioned in the frame structure, said titration system including a sample syringe that holds a controlled amount of an operational flux solution taken from a flux reservoir and a reagent syringe that holds a controlled amount of the reagent solution taken from the reagent container, said titration system including a titration container that receives a mixture of a sample of the controlled amount of the operational flux solution from the sample syringe and the controlled amount of the reagent solution from the reagent syringe, said titration system including a pH probe that determines a pH level of the mixture in the titration container, said titration system including means for causing thinner solution from the first container or reserve flux solution from the second container to be dispensed to the flux reservoir depending on the outcome of the titration test;

plumbing means for applying the operational flux solution from the reservoir to the sample syringe and applying the controlled amount of operational flux solution from the sample syringe to the titration container, and for applying the reagent solution from the reagent container to the reagent syringe and applying the controlled amount of the reagent solution to the titration container, said plumbing means being positioned within the frame structure; and a plurality of calibration sample containers positioned in the frame structure, said calibration sample containers holding a plurality of different calibration samples where each calibration sample has a known pH level, said pH probe determining the pH level of the calibration samples in order to calibrate the pH probe, said plumbing means applying the calibration samples to the sample syringe and a controlled amount of the calibration sample from the sample syringe to the titration container.

13. The apparatus according to claim 12 further comprising a filter for continuously filtering the flux operational solution from the flux reservoir, said plumbing means continuously drawing the flux solution from the flux reservoir through the filter.

14. The apparatus according to claim 12 further comprising electrical scales that are positioned to measure the weight of the first container and the second container, said apparatus further comprising means for providing a warning signal when the first or second container is empty based on an electrical signal from the electrical scales.

15. The apparatus according to claim 12 further comprising quick disconnect hoses, said quick disconnect hoses connecting the flux reservoir to a plumbing system positioned in the frame structure.

16. The apparatus according to claim 12 wherein the titration system performs the titration test on the mixture of the operational flux solution and the reagent solution to determine the pH level and acid number of the mixture, wherein the acid number of the mixture is determined by first determining a normality of the mixture by the equation $$N_S = \frac{V_R \times N_R}{V_S},$$

where $V_R$ is a volume of the reagent solution in millimeters, $N_R$ is a normality of the reagent solution, $V_s$ is a volume of the sample of the flux solution in millimeters, and $N_s$ is the normality of the sample of the flux.

17. The apparatus according to claim 12 further comprising a plurality of warning lights positioned on the frame structure, said warning lights providing an indication of the operation of the apparatus.

18. An apparatus for automatically monitoring a fluid, said apparatus comprising:

a frame structure;

a first container holding a first solution, said first solution being a constituent of the fluid, said first container being positioned within the frame structure;

a second container holding a second solution, said second solution also being a constituent of the fluid, said second container being positioned within the frame structure;

a reagent container holding a reagent solution, said reagent container being positioned within the frame structure;

a titration system positioned in the frame structure, said titration system including a sample syringe that holds a controlled amount of a third solution taken from a third container and a reagent syringe that holds a controlled amount of the reagent solution taken from the reagent container, said titration system including a titration container that receives a mixture of a sample of the controlled amount of the third solution from the sample syringe and the controlled amount of the reagent solution from the reagent syringe, said titration system including a pH probe that determines a pH level of the mixture in the titration container, said titration system including means for causing the first solution from the first container or the second solution from the second container to be dispensed to the third container depending on the outcome of the titration test;

a plurality of calibration sample containers positioned in the frame structure, said calibration sample containers holding a plurality of different calibration samples where each calibration sample has a known pH level, said pH probe determining the pH level of the calibration samples in order to calibrate the pH probe; and plumbing means for applying the third solution from the reservoir to the sample syringe and applying the controlled amount of the third solution from the sample syringe to the titration container, and for applying the reagent solution from the reagent container to the reagent syringe and applying the controlled amount of the reagent solution from the reagent syringe to the titration container, and for applying the calibration samples to the sample syringe and a controlled amount of the calibration samples from the sample syringe to the titration container, said plumbing means being positioned in the frame structure.

19. The apparatus according to claim 18 further comprising electrical scales that are positioned to measure the weight of the first and second containers, said apparatus further comprising means for providing a warning signal when the first or second container is empty based on an electrical signal from the electrical scales.

* * * * *